United States Patent
Qin et al.

(10) Patent No.: US 8,104,091 B2
(45) Date of Patent: Jan. 24, 2012

(54) SYSTEM AND METHOD FOR WIRELESS COMMUNICATION NETWORK HAVING PROXIMITY CONTROL BASED ON AUTHORIZATION TOKEN

(75) Inventors: Xiangping Qin, San Jose, CA (US);
Huai-Rong Shao, San Jose, CA (US);
Harkirat Singh, Santa Clara, CA (US);
Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 694 days.

(21) Appl. No.: 12/044,221

(22) Filed: Mar. 7, 2008

(65) Prior Publication Data

US 2009/0228983 A1 Sep. 10, 2009

(51) Int. Cl.
*G06F 11/00* (2006.01)
(52) U.S. Cl. .......................................................... 726/26
(58) Field of Classification Search .................... 726/26, 726/29; 713/168, 172; 380/247, 270, 282; 455/456.1, 456.3, 456.5, 456.6
See application file for complete search history.

(56) References Cited

U.S. PATENT DOCUMENTS

| | | | |
|---|---|---|---|
| 5,533,127 A | 7/1996 | Luther | |
| 5,592,611 A | 1/1997 | Midgely et al. | |
| 5,892,900 A | 4/1999 | Ginter et al. | |
| 5,903,882 A | 5/1999 | Asay et al. | |
| 6,285,774 B1 | 9/2001 | Schumann et al. | |
| 6,757,851 B1 | 6/2004 | Park et al. | |
| 6,801,782 B2 | 10/2004 | McCrady et al. | |
| 7,082,200 B2 | 7/2006 | Aboba et al. | |
| 7,123,627 B2 | 10/2006 | Kowalski | |
| 7,143,443 B2 | 11/2006 | Song et al. | |
| 7,146,626 B1 | 12/2006 | Arsenault et al. | |
| 7,224,804 B2 | 5/2007 | Ishiguro et al. | |
| 7,299,063 B2 | 11/2007 | Kurihara | |
| 7,320,069 B1 | 1/2008 | Sundharraj et al. | |
| 7,565,533 B2 | 7/2009 | Scheifler et al. | |
| 7,623,448 B1 | 11/2009 | Vrzic et al. | |
| 7,721,300 B2 | 5/2010 | Tipton et al. | |

(Continued)

FOREIGN PATENT DOCUMENTS

EP  1521422 A2  4/2005

(Continued)

OTHER PUBLICATIONS

Digital Control Protection LLC, High-Bandwidth Digital Content Protection System, Rev. 1.1, Jun. 9, 2003, pp. 1-85.

(Continued)

*Primary Examiner* — Beemnet Dada
(74) *Attorney, Agent, or Firm* — Kenneth L. Sherman, Esq.; Michael Zarrabian, Esq.; Myers Andras Sherman & Zarrabian LLP

(57) ABSTRACT

A system and method for providing content protection in a wireless network for transmitting uncompressed video data is disclosed. An association request is received from a new device by a domain manger. A proximity control test is conducted to determine whether the new device is located within an acceptable distance from the domain manager. The association request is granted or rejected based at least partly on the result of the proximity control test. An authorization token is transmitted to the new device when the association request is granted.

20 Claims, 15 Drawing Sheets

Domain using the Authorization Token

U.S. PATENT DOCUMENTS

| | | | |
|---|---|---|---|
| 7,936,782 B2* | 5/2011 | Qin et al. | 370/468 |
| 2001/0053699 A1 | 12/2001 | McCrady et al. | |
| 2002/0157002 A1 | 10/2002 | Messerges et al. | |
| 2003/0063745 A1 | 4/2003 | Boykin et al. | |
| 2004/0039906 A1 | 2/2004 | Oka et al. | |
| 2004/0088541 A1 | 5/2004 | Messerges et al. | |
| 2004/0103312 A1* | 5/2004 | Messerges et al. | 713/201 |
| 2004/0156354 A1 | 8/2004 | Wang et al. | |
| 2004/0258244 A1 | 12/2004 | Haq et al. | |
| 2005/0090259 A1 | 4/2005 | Jain et al. | |
| 2005/0094809 A1 | 5/2005 | Pedlow et al. | |
| 2005/0144468 A1 | 6/2005 | Northcutt et al. | |
| 2005/0229004 A1 | 10/2005 | Callaghan | |
| 2006/0002361 A1 | 1/2006 | Webster et al. | |
| 2006/0015716 A1 | 1/2006 | Thornton et al. | |
| 2006/0020784 A1 | 1/2006 | Jonker et al. | |
| 2006/0021065 A1 | 1/2006 | Kamperman et al. | |
| 2006/0025124 A1 | 2/2006 | Matsumoto | |
| 2006/0092893 A1 | 5/2006 | Champion et al. | |
| 2006/0129855 A1 | 6/2006 | Rhoten et al. | |
| 2006/0155855 A1 | 7/2006 | Hamai | |
| 2006/0177066 A1 | 8/2006 | Han et al. | |
| 2007/0061875 A1 | 3/2007 | Le Buhan et al. | |
| 2007/0135134 A1* | 6/2007 | Patrick | 455/456.1 |
| 2007/0192480 A1* | 8/2007 | Han et al. | 709/224 |
| 2007/0240191 A1 | 10/2007 | Singh et al. | |
| 2007/0291939 A1 | 12/2007 | Singh et al. | |
| 2008/0031136 A1* | 2/2008 | Gavette et al. | 370/235 |
| 2008/0133414 A1 | 6/2008 | Qin et al. | |
| 2008/0134309 A1 | 6/2008 | Qin et al. | |
| 2008/0172719 A1 | 7/2008 | Zhang et al. | |
| 2009/0034726 A1* | 2/2009 | Williams et al. | 380/258 |
| 2009/0225669 A1 | 9/2009 | Qin et al. | |
| 2009/0235330 A1 | 9/2009 | Byun et al. | |
| 2009/0254980 A1* | 10/2009 | Kanaparti | 726/4 |

FOREIGN PATENT DOCUMENTS

| | | |
|---|---|---|
| EP | 1597895 A2 | 11/2005 |
| KR | 1020050084822 | 8/2005 |
| KR | 1020060057515 A | 5/2006 |
| KR | 1020060107424 A | 10/2006 |
| KR | 1020060057515 A | 6/2008 |
| WO | WO 91/07850 | 5/1991 |
| WO | WO 02/086725 | 10/2002 |
| WO | WO 03/094533 | 11/2003 |
| WO | WO 2004/027588 | 4/2004 |
| WO | 2005034521 A1 | 4/2005 |
| WO | WO 2005/034521 | 4/2005 |
| WO | WO 2006/083141 | 8/2006 |
| WO | WO 2006/107185 | 10/2006 |

OTHER PUBLICATIONS

Digital Video Broadcasting (DVB); Content Protection & Copy Management, DVB Document A094; Nov. 2005, pp. 1-103.
FreshNews.com, SiBEAM Receives Equity Investment from Best Buy, http://freshnews.com/print/node/261440, Jan. 4, 2010, 2 pages.
Hachman, "CE Giants back Amimon's Wireless HDTV Tech," online: www.pcmag.com, 1 page, Jul. 23, 2008.
Hitachi et al., DTCP vol. 1, Supplement E, Mapping DTCP to IP (Informational Version) Revision 1.2; http://www.dtcp.com, Jun. 2007, pp. 1-46.
Hitachi et al., High-Definition Multimedia Interface (HDMI) Specifications version 1.2, Aug. 22, 2005, pp. 1-214.
LG Electronics Inc., WirelessHD Specification Version 1.0 Overview, Oct. 9, 2007, 77 pages.
NEC develops compact millimeter-wave transceiver for uncompressed HDTV signal transmission, NE Asia Online, Apr. 5, 2005, (Downloaded from http://neasia.nikkeibp.com/topstory/000913 on Sep. 29, 2006.).
Podesser et al., Selective Bitplane Encryption for Secure Transmission of Image Data in Mobile Environments, CD-Rom Proceedings of the 5th IEEE Nordic Signal Processing Symposium (NORSIG 2002), Tromo-Trondheim, Norway, Oct. 2002, IEEE Norway Section, pp. 1-6.
European Search Report [Supplementary] dated Dec. 3, 2009 for Application No. EP 07851215, filed Dec. 4, 2007.
International Search Report dated Feb. 21, 2008 for PCT/KR07/006228, filed Dec. 4, 2007.
International Preliminary Report on Patentability and Written Opinion dated Jun. 10, 2009 for PCT/KR07/006228, filed Dec. 4, 2007.
International Search Report dated May 26, 2007 for PCT/KR2007/000828, filed Feb. 15, 2007.
International Preliminary Report on Patentability dated Aug. 19, 2008 for PCT/KR2007/000828, filed Feb. 15, 2007.
International Search Report dated Feb. 18, 2008 for PCT/KR2007/006224, filed Dec. 4, 2007.
International Preliminary Report on Patentability dated Jun. 10, 2009 for PCT/KR2007/006224, filed Dec. 4, 2007.
International Search Report dated Dec. 18, 2007 for PCT/KR2007/002438, filed May 18, 2007.
International Preliminary Report on Patentability dated Sep. 22, 2009 for PCT/KR2007/002438, filed May 18, 2007.
U. S. Office Action dated Dec. 7, 2009 for U.S. Appl. No. 12/044,712, filed Mar. 7, 2008.
Caetano, Lianne, SiBEAM—60 GHz Architecture for Wireless Video Display, SiBEAM, Inc. White Paper, Mar. 2006, [Available online: http://www.sibeam.com/whtpapers/60_GHz_for_WirelessHD_3_06.pdf], pp. 1-6.
Tosun et al., Efficient Multi-Layer Coding and Encryption of MPED Video Streams, IEEE 2000, pp. 119-122.
Tosun et al., Lightweight Security Mechanisms for Wireless Video Transmission, IEEE 2001, pp. 157-161.
U.S. Office Action dated Apr. 13, 2010 in U.S. Appl. No. 11/706,897, filed Feb. 13, 2007.
http://www.dtcp.com—printed on Oct. 24, 2008.
Part 11: Wireless LAN Medium Access Control (MAC) and Physical Layer (PHY) Specifications—IEEE Computer Society, IEEE Std. 802.11—Jun. 12, 2007.
U.S. Non-final Office Action for U.S. Appl. No. 11/948,888 mailed Feb. 2, 2011.
U.S. Non-final Office Action for U.S. Appl. No. 11/948,742 mailed Dec. 14, 2010.
Korean Office Action dated Nov. 30, 2009 issued in Korean Patent Application No. 10-2007-0125181 from Korean Intellectual Property Office, pp. 1-3, Seo-gu, Daejeon, Republic of Korea.
European Office Action dated Mar. 2, 2010 issued in European Patent Application No. 07851215.9 from European Patent Office, pp. 1-4, Netherlands.
Korean Office Action dated May 25, 2009 issued in Korean Patent Application No. 10-2007-0125181 from Korean Intellectual Property Office, pp. 1-3, Seo-gu, Daejeon, Republic of Korea.
Korean Final Office Action dated Jan. 12, 2010 issued in Korean Patent Application No. 10-2007-0125182 from Korean Intellectual Property Office, pp. 1-2, Seo-gu, Daejeon, Republic of Korea.
Korean Office Action dated Oct. 28, 2009 issued in Korean Patent Application No. 10-2007-0125182 from Korean Intellectual Property Office, pp. 1-3, Seo-gu, Daejeon, Republic of Korea.
Korean Decision to Grant dated Apr. 23, 2010 issued in Korean Patent Application No. 10-2007-0125181, Korean Intellectual Property Office, 2 pages, Seo-gu, Daejeon, Republic of Korea.
U.S. Final Office Action for U.S. Appl. No. 11/948,888 mailed Jul. 1, 2011.
U.S. Restriction Requirement for U.S. Appl. No. 11/948,742 mailed Aug. 25, 2010.
U.S. Final Office Action for U.S. Appl. No. 11/948,742 mailed May 27, 2011.

* cited by examiner

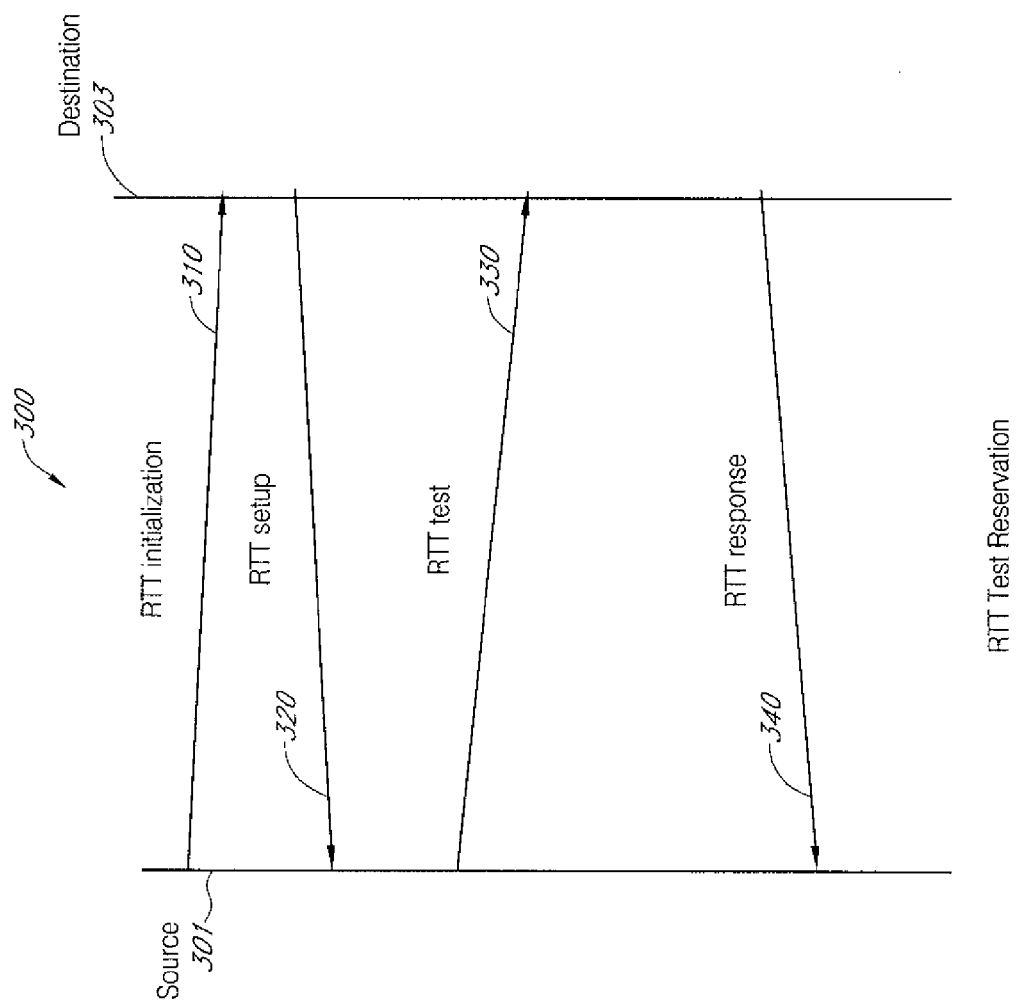

RTT test for proximity control

RTT Test Preparation for DCF function

RTT Test Preparation for PCF function

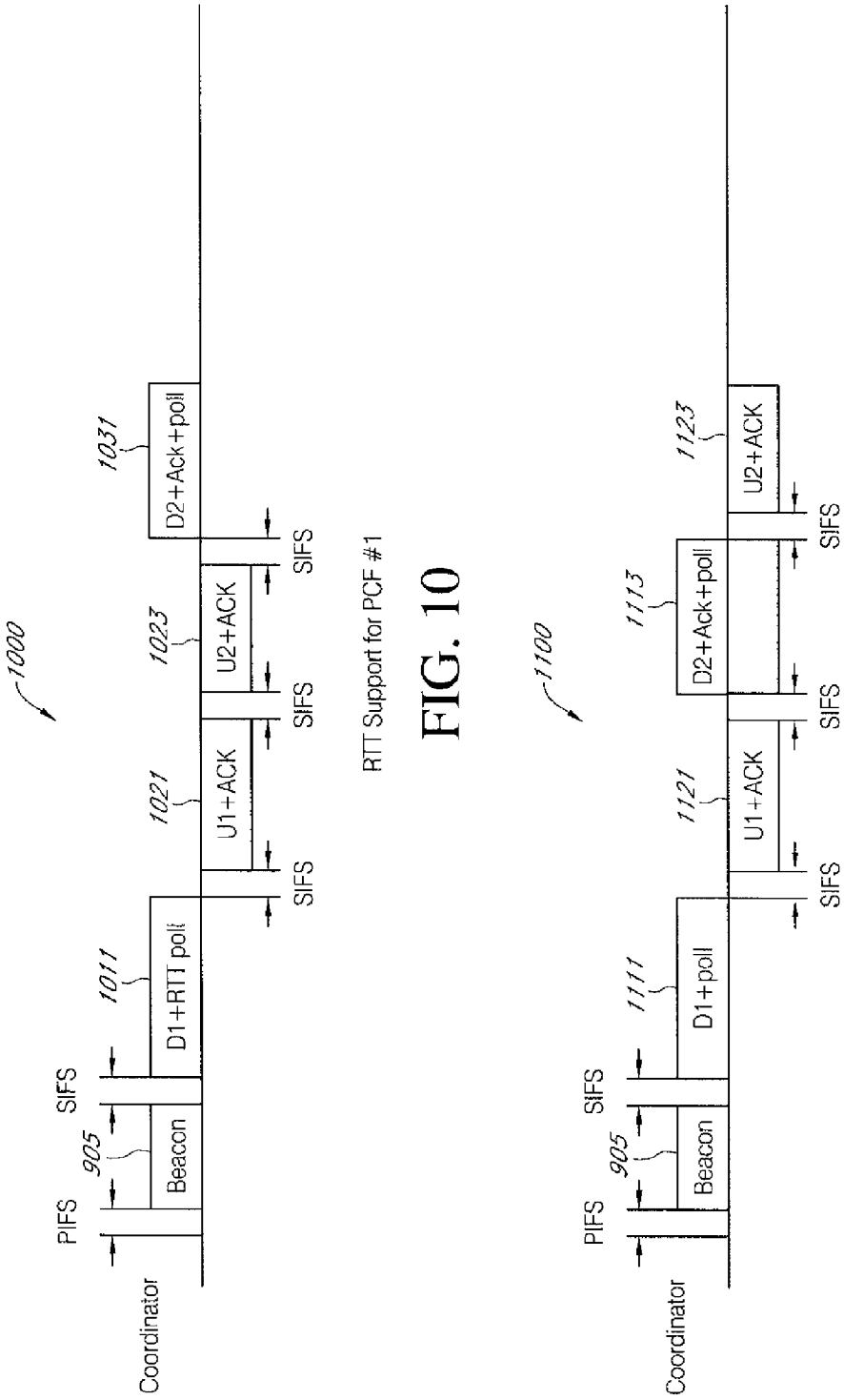

Domain using the Authorization Token

Association with domain manager

SYSTEM AND METHOD FOR WIRELESS COMMUNICATION NETWORK HAVING PROXIMITY CONTROL BASED ON AUTHORIZATION TOKEN

BACKGROUND OF THE INVENTION

1. Field of the Invention

The present invention relates to wireless transmission in a wireless network, and in particular, to content protection for wirelessly transmitted video data based on proximity control.

2. Description of the Related Art

For copyrighted content transmission via wireless media, the content provider is typically subject to proximity control requirements so that the wirelessly transmitted content, e.g., video or music, is used within a limited range of area. An essential element to any proximity control scheme is the measurement of distance between two devices, e.g., a Source and a Destination. A Round Trip Time (RTT) test is one method used to measure the Source-to-Destination distance. Round trip time is the duration measured from when a message is transmitted by a Source until when a response from a Destination is received by the Source. Only when the RTT test is passed, authorization keys are exchanged and the content is transmitted between the devices. For example, in the Digital Transmission Content Protection (DTCP) protocol, which is widely used for point-to-point communication (e.g., between a DVD player and a digital television), the RTT needs to be less than 7 ms.

Certain existing proximity control protocols, such as the DTCP, are designed for point-to-point wired communication. In a point-to-point wired communication, the two communicating devices are largely free from interferences from other devices. However, for wireless communication networks, e.g., a WLAN, where multiple users are accessing the same medium, interferences from other devices in the network are commonplace; and, consequently, the RTT test between Source and Destination may fail because of random access delays caused by the interferences from other devices. The resulting retransmissions introduce delays, and in some instances, devices within an allowed proximity can be falsely refused. Accordingly, proximity control schemes that are designed for use in wireless communication networks are desirable.

SUMMARY OF THE INVENTION

The system, method, and devices of the invention each have several aspects, no single one of which is solely responsible for its desirable attributes. Without limiting the scope of this invention as expressed by the claims which follow, its more prominent features will now be discussed briefly.

In one embodiment, there is a method of providing content protection in a wireless network for transmitting uncompressed video data, the method comprising receiving an association request from a new device by a domain manager; conducting a proximity control test to determine whether the new device is located within an acceptable distance from the domain manager; and determining whether to grant or reject the association request based at least partly on the result of the proximity control test.

In another embodiment, there is an apparatus for providing content protection in a wireless domain for transmitting uncompressed video data, the apparatus comprising a receiver configured to receive an association request from a new device; and a processor configured to conduct a proximity control test to determine whether the new device is located within an acceptable distance from the apparatus, and determine whether to grant or reject the association request based at least partly on the result of the proximity control test.

In another embodiment, there is a method of providing content protection in a wireless network for transmitting uncompressed video data, the method comprising receiving an authorization token transmitted from a second device by a first device located within a domain having an acceptable proximity range; verifying that the authorization token is issued to the second device for being located within the domain; and transmitting protected content to the second device.

In another embodiment, there is an apparatus for providing content protection in a wireless domain for transmitting uncompressed video data, the apparatus comprising a processor configured to receive an authorization token transmitted from another device located within a domain having an acceptable proximity range, and verify that the authorization token is issued to the other device for being located within the domain; and a transmitter configured to transmit protected content to the second device.

In another embodiment, there is a computer-usable medium in a system for providing content protection in a wireless network for transmitting video data having computer readable code comprising instructions for receiving an association request from a first device by a domain manager in a wireless domain having an acceptable proximity range, conducting a proximity control test to determine whether the first device is located within the acceptable proximity range, and determining whether to grant or reject the association request based at least partly on the result of the proximity control test.

BRIEF DESCRIPTION OF THE DRAWINGS

FIG. 3A is a timing diagram illustrating an example of a Round Trip Time (RTT) test procedure between a Source and a Destination.

FIG. 10 is a timing diagram illustrating an example of RTT test support for the PCF function according to certain embodiments.

FIG. 11 is a timing diagram illustrating another example of RTT test support for the PCF function according to certain embodiments.

DETAILED DESCRIPTION OF CERTAIN INVENTIVE EMBODIMENTS

Certain embodiments provide a method and system for proximity control in a wireless communications network.

The following detailed description is directed to certain sample embodiments of the invention. However, the invention can be embodied in a multitude of different ways as defined and covered by the claims. In this description, reference is made to the drawings wherein like parts are designated with like numerals throughout.

Embodiments include systems and methods of proximity control of transmission of copyright protected audio/video (A/V) contents in a wireless communications network will be described. In particular, certain embodiments representing proximity control schemes based on a Round Trip Time (RTT) test at the media access control (MAC) layer based on wireless protocols, e.g., IEEE 802.11, will be described. Also certain embodiments representing other proximity control schemes based on an authorization token will be described.

Figure 1:
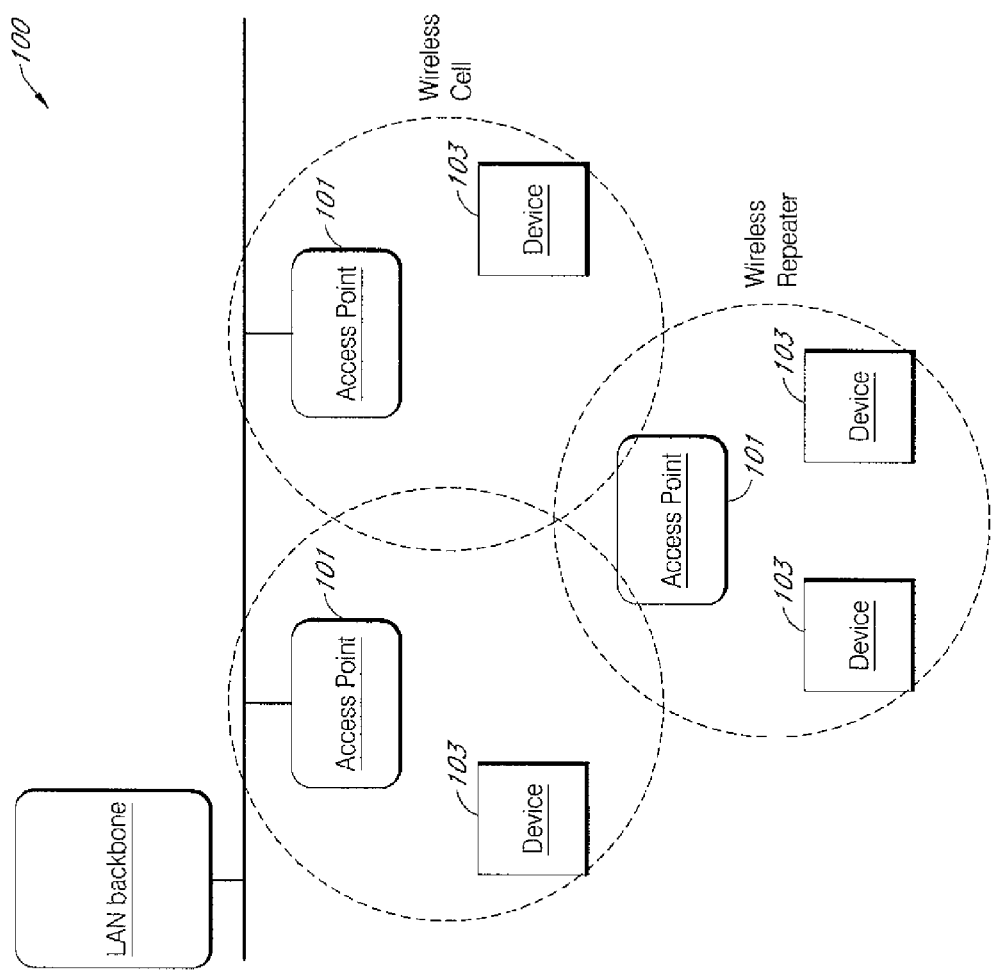
FIG. 1 is a block diagram illustrating an example wireless local area network (WLAN) configuration using an access point.

Exemplary implementations of the embodiments in a wireless local area network (WLAN) will now be described. FIG. 1 is a block diagram illustrating an example wireless local area network (WLAN) configuration 100 using an access point 101. The example WLAN configuration 100 includes one or more access points 101 and one or more wireless devices 103. The access point is a device that connects a wireless device 103 to the WLAN. In an access point based topology, the access points are connected to a wired or wireless backbone and routes the traffic through the wired (e.g., Ethernet or token ring) or wireless backbone. In a WLAN, the access point enables a wireless device 103 to communicate with other wired or wireless devices on the WLAN. In certain embodiments, the access point supports the IEEE 802.11 Protocol.

In certain embodiments, the access point 101 includes a receiver of wireless signals, and the wireless client device 103 includes a sender of the wireless signals. In other embodiments, the access point 101 includes a sender of wireless signals, and the wireless client device 103 includes a receiver of the wireless signals. In some of such embodiments, the wireless signals include audio content. In other embodiments, the wireless signals include video content. In yet other embodiment, the wireless signals include text content such as a publication. For example, the access point 101 can be a sink of video and/or audio data implemented, such as, in an HDTV set in a home wireless network environment which is a type of WLAN. The wireless device 103 can be a source of compressed or uncompressed video or audio. Examples of the wireless device 103 include a set-top box, a DVD player or recorder, a digital camera, a camcorder, and so forth. In some embodiments, the content can be protected content.

Figure 2:
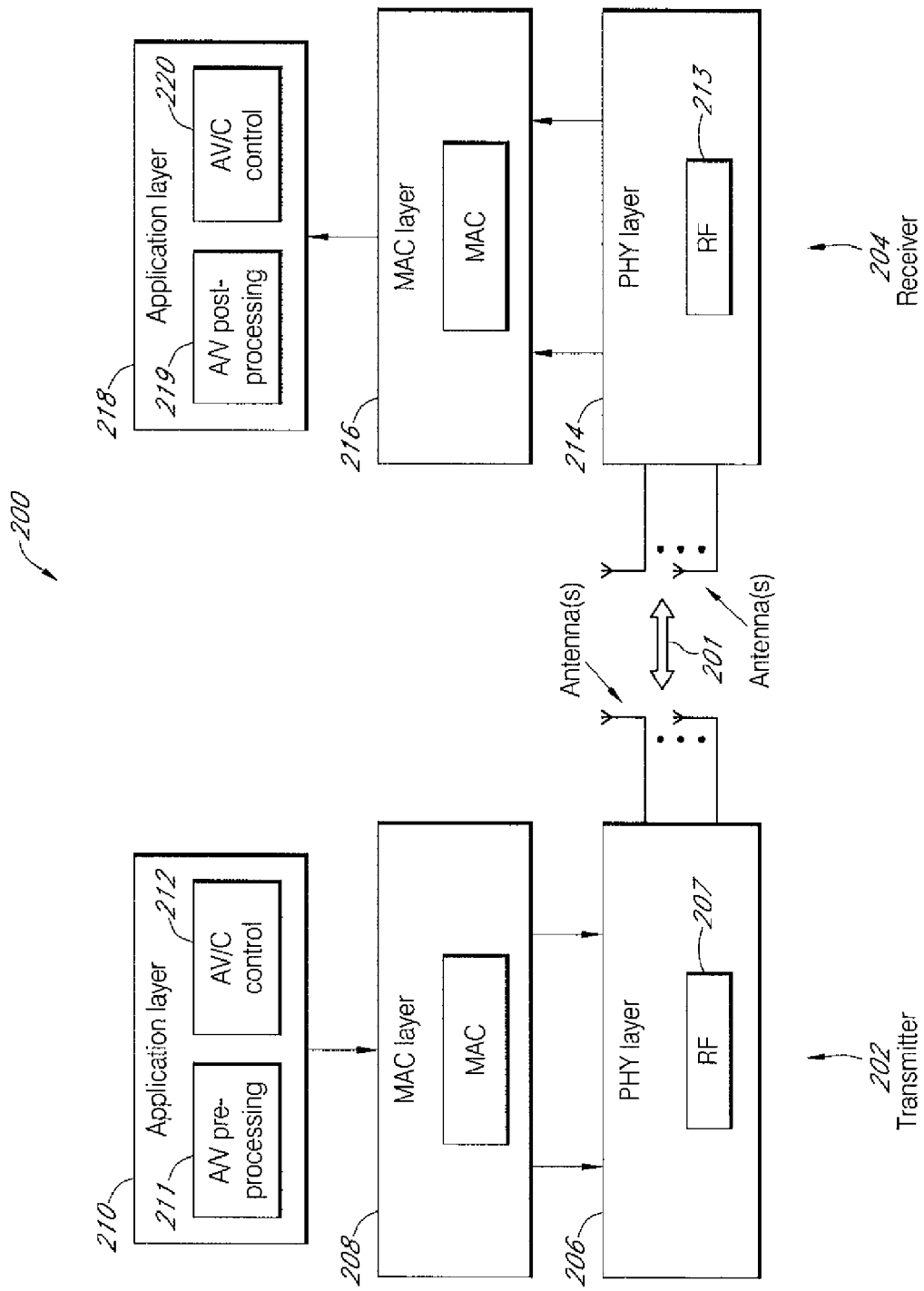
FIG. 2 is a functional block diagram of an example wireless local area network (WLAN) system, according to one embodiment of the system and method.

FIG. 2 illustrates a functional block diagram of an example wireless local area network (WLAN) system 200. The example WLAN system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes a content pre-processing module 211 and a content control module 212. The content pre-processing module 211 can perform pre-processing of the content such as partitioning of video content. The content control module 212 provides a standard way to exchange content handling information such as A/V capability information. For example, before a connection begins, the content control module negotiates the A/V formats to be used, and when the need for the connection is completed, content control commands are used to stop the connection.

In the transmitter 202, the PHY layer 206 communicates with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216 process the received packets. The PHY layer 214 communicates with the MAC layer 216 and with the RF module 213. The application layer 218 of the receiver 204 includes a content post-processing module 219 and a content control module 220. The module 219 can perform an inverse processing method of the module 211, for example, to regenerate the uncompressed video, for example. In certain embodiments, the content control module 220 operates in a complementary way with the content control module 212 of the transmitter 202.

FIG. 3A is a timing diagram illustrating an example of a Round Trip Time (RTT) test procedure 300 between a Source 301 and a Destination 303. The procedure 300 includes an authentication procedure and the RTT test itself. In certain proximity protocols, the RTT test needs to be authenticated so that the system will not be compromised by malicious users. During the authentication procedure, authentication messages—a RTT initialization message 310 and a RTT setup message 320—are used to exchange authentication information between the RTT Source 301 and the RTT Destination 303. These messages can be transmitted through a random access period or through reservation. In wireless communication networks, e.g., WLAN, where multiple users are accessing the same medium, interferences from other devices in the network are commonplace; and, consequently, the actual RTT test involving transmission and reception of the RTT test data 330 and the RTT response data 340, respectively, may be delayed because of random access delays caused by the interferences from other devices. For example, if the authentication messages 310 and 320 are exchanged in the random access period, and the first transmission 330 failed because of interferences, second or third trials can be made. Because the RTT test is used to measure the round trip time, retransmissions introduce delays; and the devices in each other's proximity may be falsely refused. Certain embodiments of proximity control schemes designed to reduce interferences from other devices during RTT test are described below.

I. Proximity Control Schemes Based on RTT Test Using Randomaccess with Collision Avoidance and Polling Functions Some wireless protocols, e.g., IEEE 802.11, define and support reservation functions to avoid having stations transmit at the same time with the goal of reducing interferences and retransmissions in a wireless network, e.g., WLAN. In the IEEE 802.11 and 802.11e protocols, the defined reservation functions include Distributed Coordinated Function (DCF), Point Coordinated Function (PCF), and Hybrid Coordinated Function (HCF). Because these reservation functions are designed to avoid interferences from other devices during data transmission between two devices, they may be used as platforms for launching the RTT test for proximity control. Certain embodiments of RTT test supports for the 802.11/802.11e defined reservation functions, e.g., DCF, PCF, HCF, are described below.

Figure 3B:
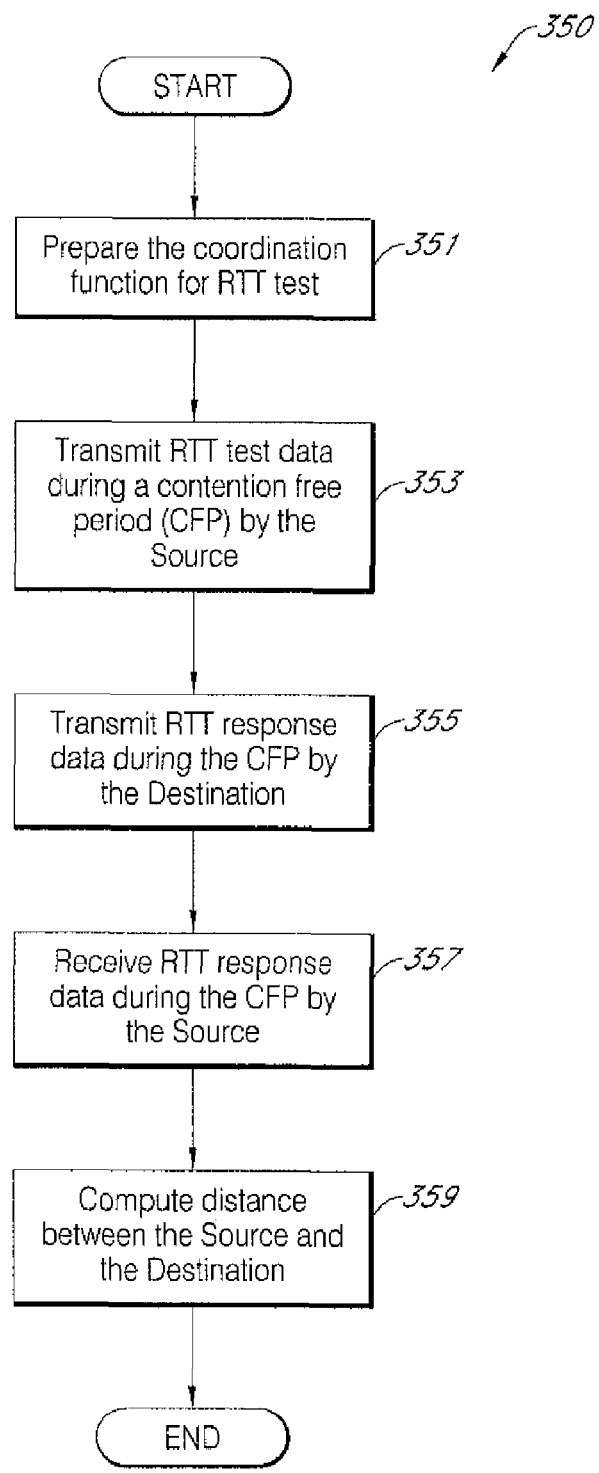
FIG. 3B is a flow diagram illustrating an example process for conducting a RTT test for proximity control using a reservation function in a WLAN according to certain embodiments.

FIG. 3B is a general flow diagram illustrating a process 350 for conducting a RTT test for proximity control using a reservation function in WLAN. Specific examples of systems and methods for conducting the RTT test are described in detail below. The process 350 starts at state 351, where a reservation function is prepared for RTT test between an RTT Source 301 and an RTT Destination 303, such as the ones shown in FIG. 3A. The RTT test preparation can be different for different reservation functions and will be described in detail below with respect to individual reservation functions. The process moves to state 353, where RTT test data is transmitted by the RTT Source during a contention-free period (CFP). The contention-free period refers to a time period in which transmissions by one or more devices in the WLAN other than the RTT Source and the RTT Destination are suppressed or disabled for reducing interferences. The process then moves to state 355, where RTT response data is transmitted by the RTT Destination also during a CFP. The process then moves to state 357, where the RTT response data is received by the RTT Source also during a CFP. The process then moves to state 359, where distance between the RTT Source and the RTT Destination is computed for the purpose of proximity control of copyrighted content.

a) RTT Test Based on DCF

Figure 4:
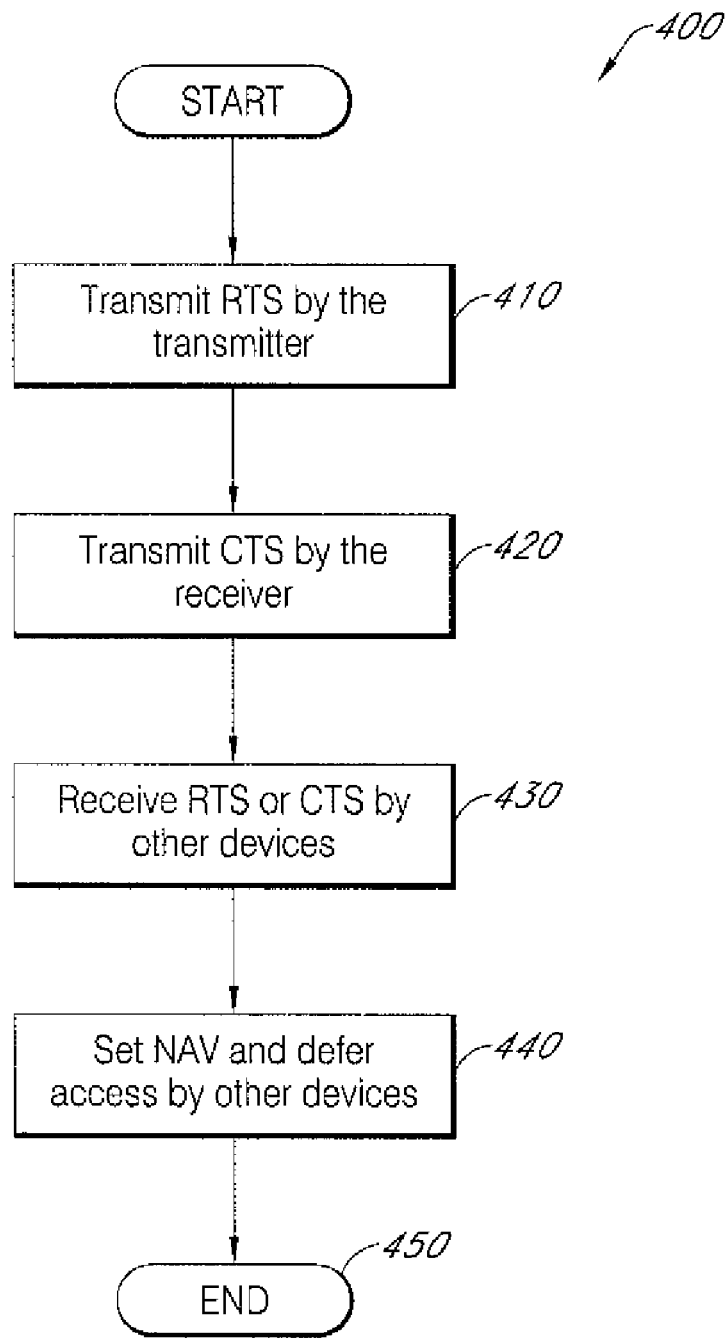
FIG. 4 is a flow diagram illustrating an example process for preparing the DCF function of IEEE 802.11 for a RTT test according to certain embodiments.

DCF is a reservation function that is fundamental to the IEEE 802.11 WLAN standard and is a form of a carrier sense multiple access with collision avoidance (CSMA/CA) protocol. CSMA/CA protocol requires stations in a wireless network to first sense the medium before transmitting. CSMA/CA, in turn, is a form of distributed media access control scheme for a distributed/ad hoc topology. Here, the distributed media access control scheme refers to techniques for accessing the media by individual devices without involving a central control device, e.g., a coordinator. FIG. 4 is a flow diagram illustrating an example process 400 for preparing the DCF function of IEEE 802.11 for a RTT test according to certain embodiments. The process 400 begins at state 410, where an RTT Source transmits a Request-To-Send (RTS) message. The process moves to state 420, where an RTT Destination, after receiving the RTS, transmits a Clear-To-Send (CTS) message. The process then moves to state 430, where after receiving either the RTS from the RTT Source or the CTS from the RTT Destination, one or more devices other than the RTT Source and the RTT Destination set a Network Allocation Vector (NAV) and stop transmissions, The NAV is used within a WLAN to prevent devices accessing the wireless medium and causing contention. In certain embodiments, the NAV is an indicator, maintained by each device, of time periods when transmission will not be initiated even though there is no traffic on the medium.

Figure 5:
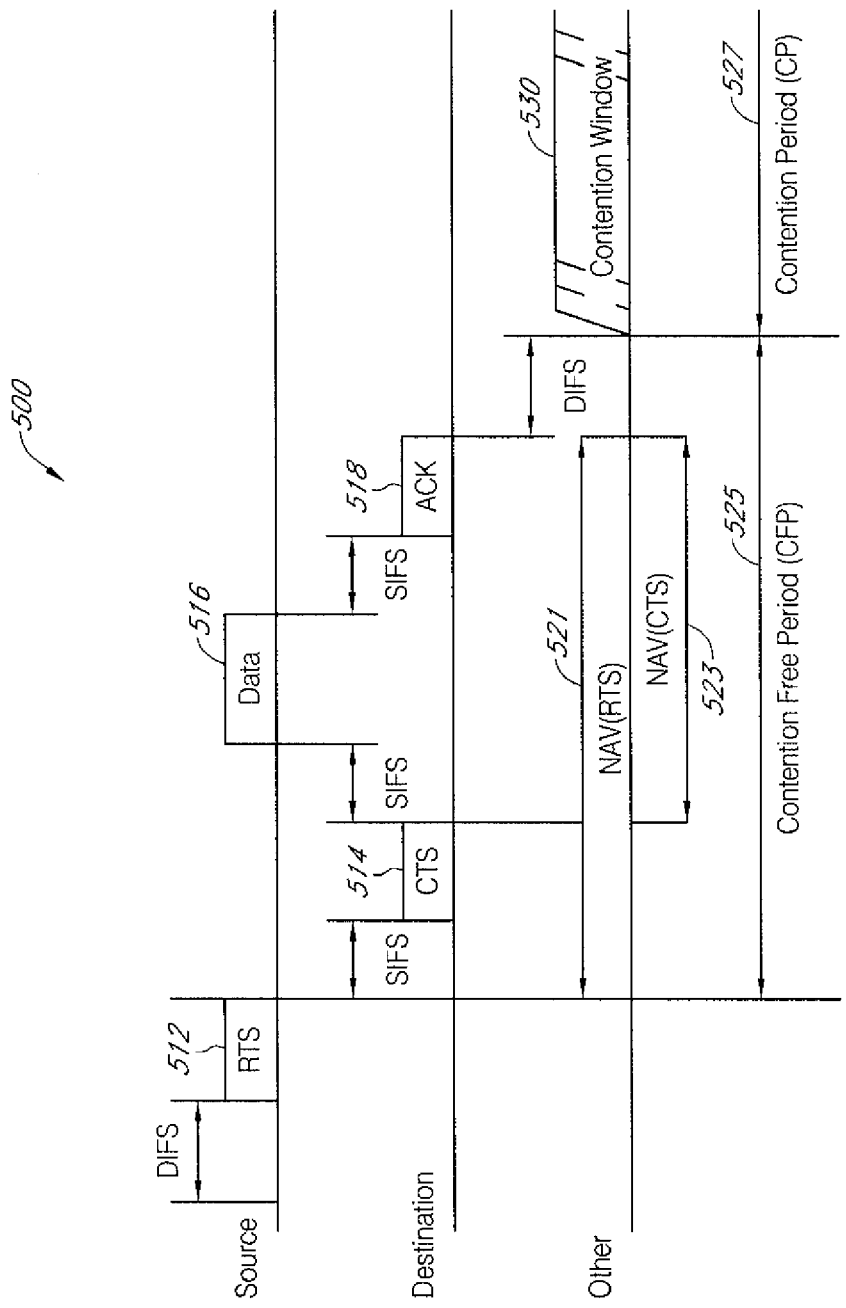
FIG. 5 is a timing diagram illustrating an example of the existing distributed coordinated function (DCF) defined within IEEE 802.11.

FIG. 5 is a timing diagram 500 illustrating an example of the existing distributed coordinated function (DCF) defined within the IEEE 802.11 and included for the purpose of illustrating certain embodiments of the RTT test support for the DCF function described below with reference to FIG. 6 and FIG. 7. The 802.11 standard makes it mandatory that all stations implement the DCF, a form of carrier sense multiple access with collision avoidance (CSMA/CA). Schemes to support RTT test using the DCF function are described below. In DCF, a data communication 516 from a Source to a Destination takes place during a contention free period (CFP) 525. The CFP condition is created when one or more devices other than the Source and the Destination receive either Request-To-Send (RTS) 512 transmitted by the Source or Clear-To-Send (CTS) 514 transmitted by the Destination and maintain a NAV 521, 523 and stop contending for data transmissions. The CFP expires after the Destination transmits an acknowledgement (ACK) 518, and a contention period (CP) 527 and a corresponding contention window 530 follows.

Figure 6:
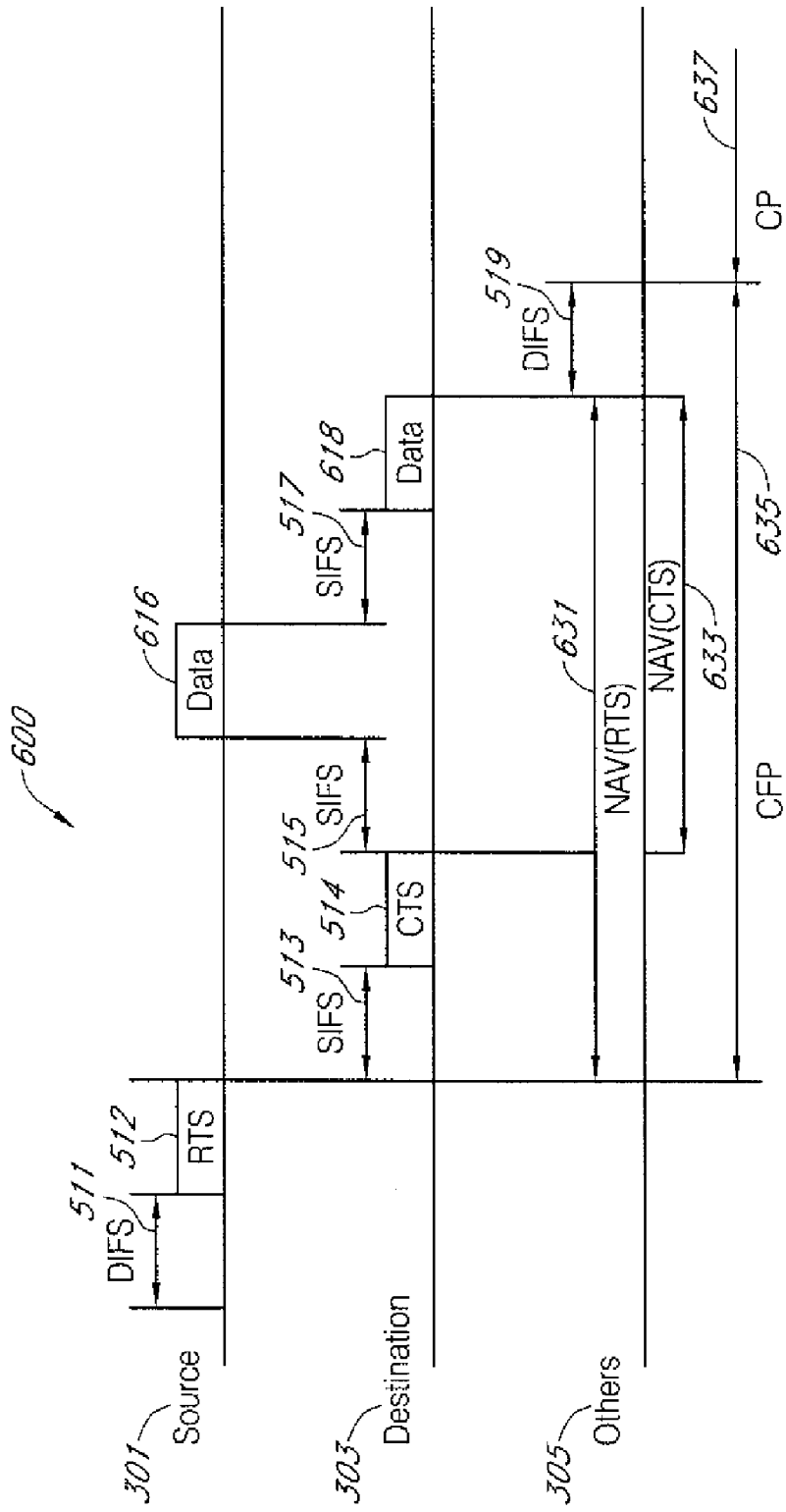
FIG. 6 is a timing diagram illustrating an example of RTT test support for the DCF function according to certain embodiments.

FIG. 6 is a timing diagram 500 illustrating an example of RTT test support for the DCF function according to certain embodiments. To support a RTT test, modifications need to be made to existing DCF functions such as the one illustrated in FIG. 5. For example, in IEEE 802.11, in RTS and CTS frame formats, there can be two fields: type (control) 2 bits and subtype 4 bits. The fields are combined to indicate which type of control these RTS and CTS are for. To support RTT test, these bits are used to indicate that these RTS and CTS are for RTT control. In certain embodiments, a duration field of the RTS or CTS is also set accordingly for RTT control, so that the corresponding NAV is set specially for RTT test. In certain embodiments, the duration field includes a suggested time duration for the NAV. The reservation of DCF for RTT test is used for both directions of transmissions. Returning to FIG. 6, the RTT Source 301 transmits the RTS 512 after the wireless medium has been idle for a first DCF inter-frame space (DIFS) period 511. After receiving the RTS 512, the RTT Destination 303 transmits the CTS 514 following a first short inter-frame space (SIFS) 513. After receiving the CTS, the RTT Source transmits a RTT test data 616 following a second SIFS 515. After receiving the RTT test data 616, the RTT Destination transmits a RTT response data 618 following a third SIFS 517.

With regards to the other devices 305 in the WLAN, they can maintain the NAV and stop contending channels for data transmissions in one of two ways. The first way is where the other devices maintain a RTS-triggered NAV 631 after receiving the RTS 512 transmitted by the RTT Source. The maintenance of the RTS-triggered NAV 631 can mark the beginning of a contention free period (CFP) 635. The second way is where the other devices maintain a CTS-triggered NAV 633 after receiving the CTS message 514 transmitted by the RTT Destination. In the example embodiment shown, the RTS-triggered NAV 631 is set as 3*SIFS+CTS+2*DATA, while the CTS-triggered NAV 633 is set for a time period as 2*SIFS+2*DATA. After the period indicated by the NAY is past, the defer access period 635 finally expires following a second DIFS period 519. After the expiration of the CFP 635, a contention period (CP) 637 returns during which all devices in the WLAN are allowed to contend a channel to initiate transmissions.

Figure 7:
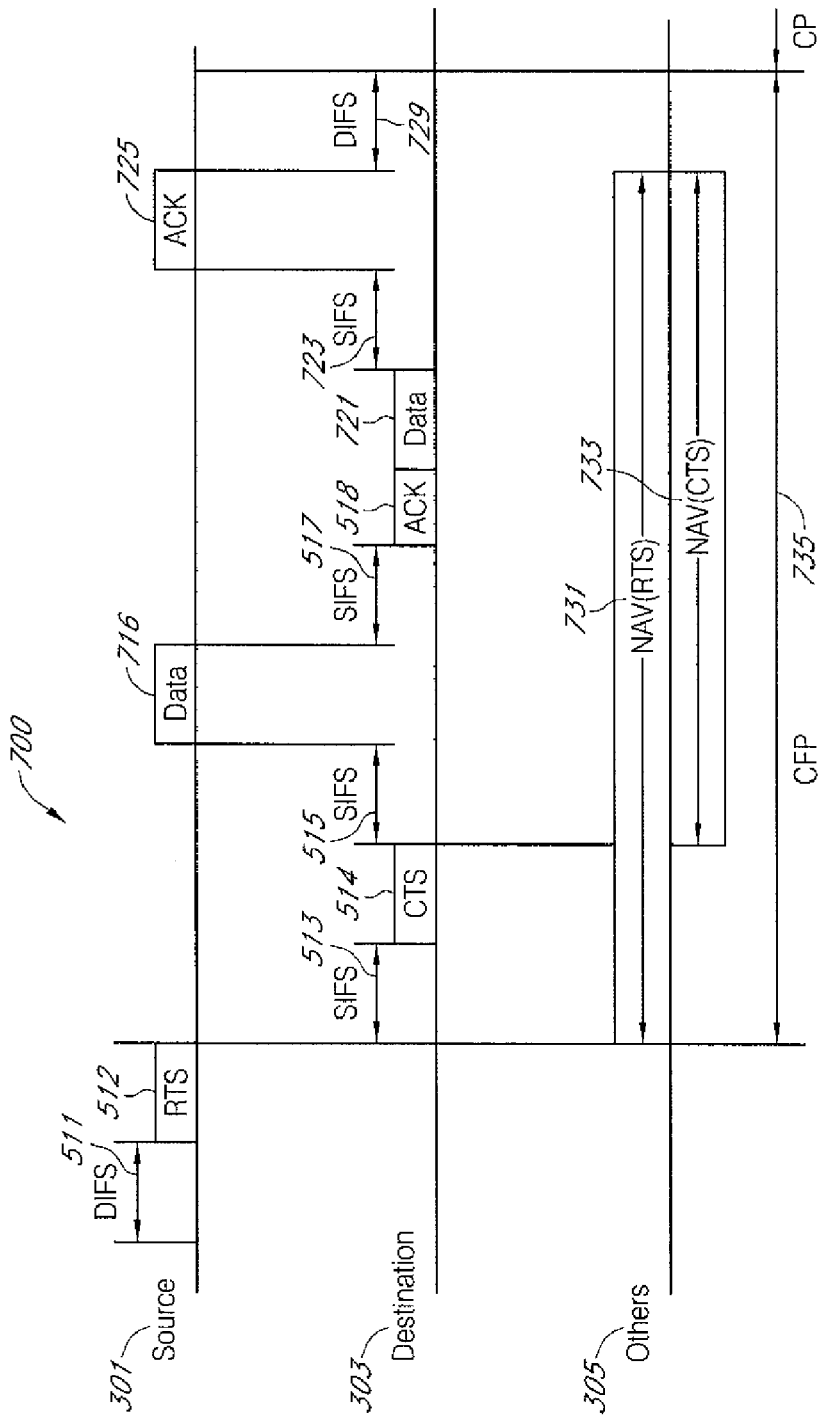
FIG. 7 is a timing diagram illustrating another example of RTT test support for the DCF function according to certain embodiments.

FIG. 7 is a timing diagram 700 illustrating another example of RTT test support for the DCF function according to certain embodiments. The RTT Source 301 transmits the RTS 512 after the wireless medium has been idle for a first DCF inter-frame space (DIFS) period 511. After receiving the RTS message 512, the RTT Destination 302 transmits the CTS 514 following a first short inter-frame space (SIFS) 513. After receiving the CTS, the RTS Source transmits a RTT test data 716 following a second SIFS 515. After receiving the RTT test data 716, the RTT Destination transmits an Acknowledgement (ACK) 518 following a third SIFS 517. Immediately following the ACK 518, the RTT Destination transmits a RTT response data 721. After receiving the ACK message and the RTT response data, the RTT Source transmits its own ACK message 725 following a fourth SIFS 723. In the example embodiment shown, the RTS-triggered NAV 731 is set as 4*SIFS+CTS+2*DATA+2*ACK, while the CTS-triggered NAV 733 is set as 3*SIFS+2*DATA+2*ACK.

b) RTT Test Based on PCF

Figure 8:
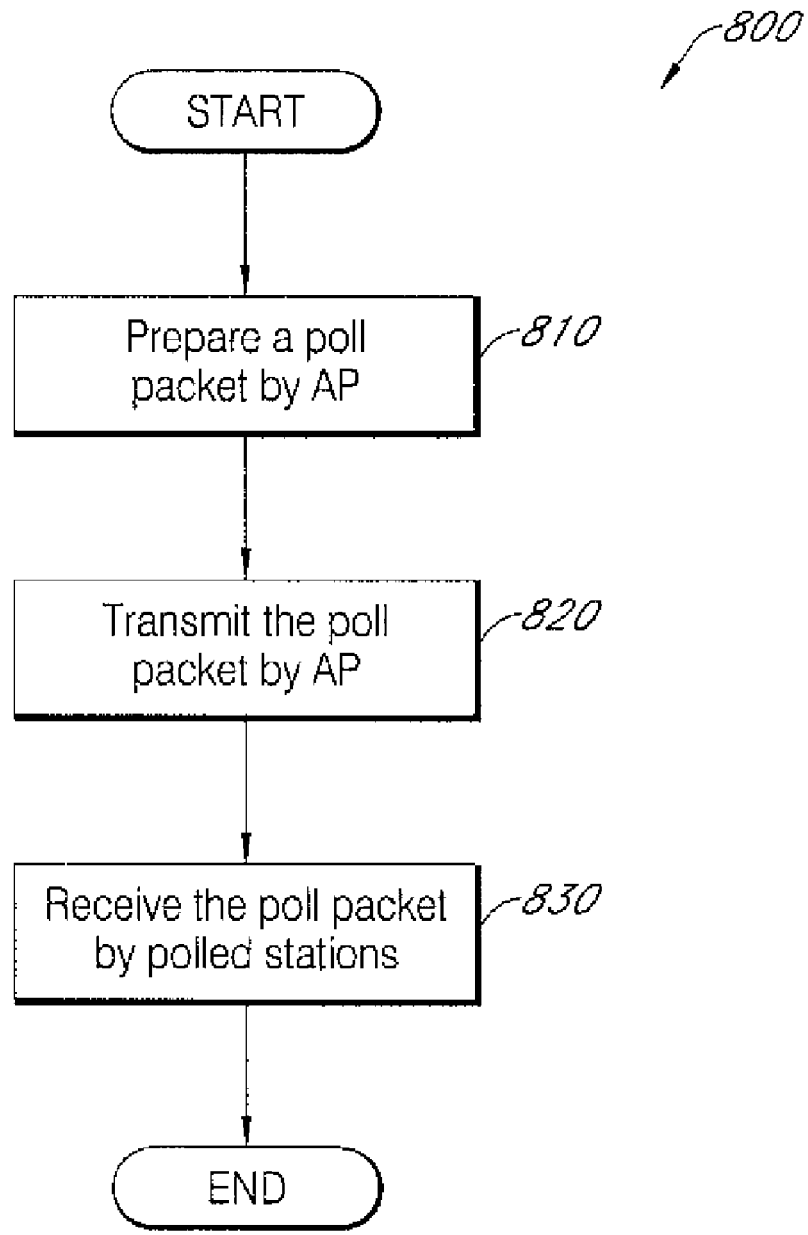
FIG. 8 is a flow diagram illustrating an example process for preparing the point coordinated function (PCF) of IEEE 802.11 for RTT test according to certain embodiments.

FIG. 8 is a flow diagram illustrating an example process 800 for preparing the PCF function of IEEE 802.11 for RTT test according to certain embodiments. The process 800 begins at state 810, where an access point (AP) prepares a poll packet. The poll packet includes a MAC address for the polled station. In certain embodiments, the polled packet includes a MAC address for the RTT Source. In certain other embodiments, the poll packet includes MAC addresses for both the RTT Source and the RTT Destination. The process moves to state 820, where the AP transmits the poll packet. The process then moves to state 830, where the poll packet is received by the polled station. The process 800 completes at an end state.

Figure 9:
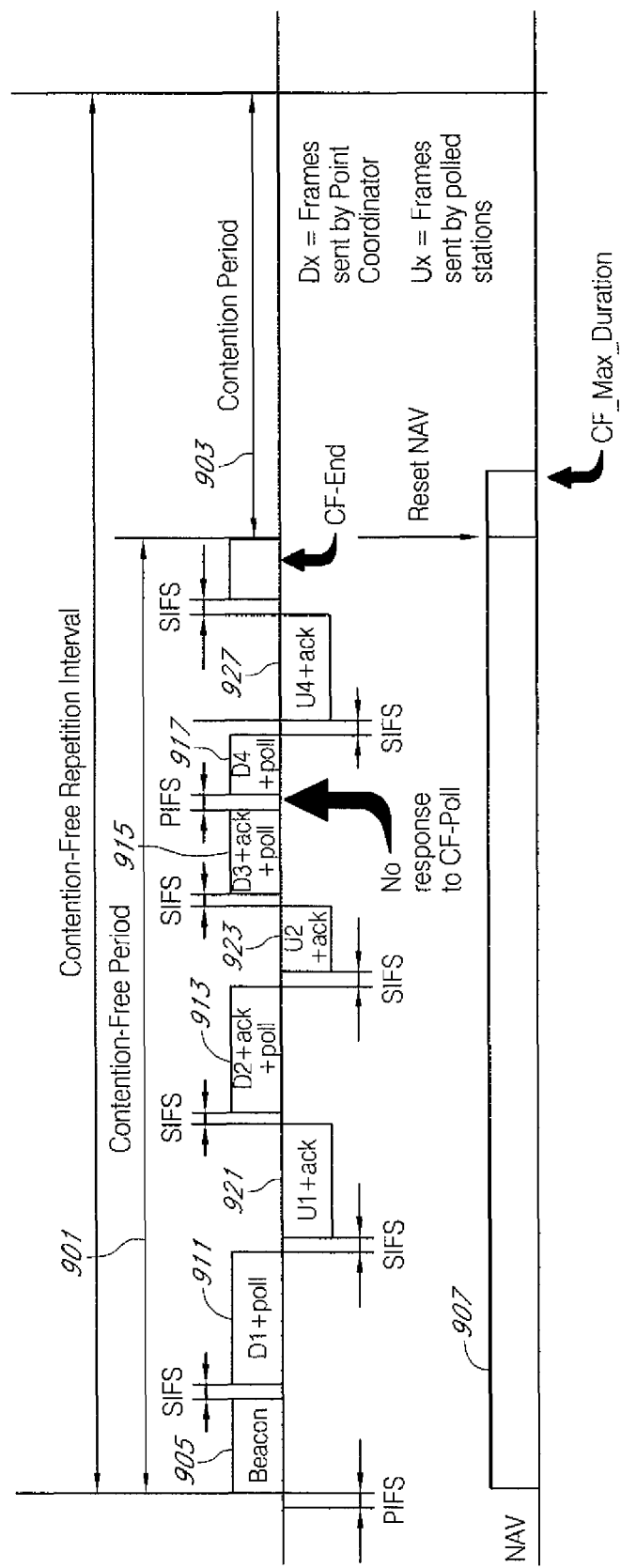
FIG. 9 is a timing diagram illustrating an example of the existing point coordinated function (PCF) defined within the IEEE 802.11.

FIG. 9 is a timing diagram illustrating an example of the existing point coordinated function (PCF) defined within IEEE 802.11 and included for the purpose of illustrating certain embodiments of the RTT test support for the PCF function described below with reference to FIG. 10 and FIG. 11. The original 802.11 protocol defines another reservation function called the Point Coordinated Function (PCF). The PCF is available only in "infrastructure" mode, where stations are connected to the network through an Access Point (AP). In the example, the AP is the coordinator in the WLAN. Unlike the DCF, which is mandatory in IEEE 802.11, the PCF mode is optional. Also unlike the DCF, which is a CSMS/CA-based reservation function based on a distributed media access control scheme, the PCF is a centralized media access control scheme involving a central control device, e.g. an access point (AP). In particular, the PCF is based on a polling-based centralized media access scheme in which the central control device, e.g., AP, polls devices to initiate a contention-free data communication between the polled devices. In the PCF mode, the AP sends beacon frames 905 at regular intervals. Between these beacon frames, the PCF defines two periods: the Contention Free Period (CFP) 901 and the Contention Period (CP) 903. The NAV 807 is maintained throughout CFP 901, suppressing data transmissions. In CP 903, the DCF is simply used. In CFP 901, the AP sends Contention Free-Poll (CF-Poll) packets 911, 913, 915, and 917 to each station, one at a time, to give them the right to send data packets 921, 923, and 927. In the example given, no response to the third CF-Poll packet 925 was received.

FIG. 10 is a timing diagram 1000 illustrating an example of RTT test support for the PCF function according to certain embodiments. In the example, the AP, e.g., the coordinator, after transmitting the beacon 905, polls a pair of stations, e.g., Device A and Device B, at one time by transmitting a CF-Poll packet 1011. In the first CF-Poll packet 1011, MAC addresses for the both polled stations are included. In response to the CF-Poll packet 1011, one station transmits a first data packet 1021. The first data packet 1021 includes RTT test data and ACK. In response to the first data packet 1021, the other station transmits a second data packet 1023. The second data packet includes RTT response data and ACK. After the AP receives the ACK from the RTT Destination, it can poll another pair of stations by sending another CF-Poll packet 1031.

FIG. 11 is a timing diagram 1100 illustrating another example of RTT test support for the PCF function according to certain embodiments In the example, MAC addresses for a pair of stations being polled are put into different CF polling packets 1111 and 1113. However, in some embodiments, the MAC addresses of this pair of stations can be put into the polling queue adjacent to each other. In certain embodiments, the stations are polled one after another to reduce any access delays. In the example, the CF polling packets include a first CF polling packet 1111 and a second CF polling packet. In response to the first CF polling packet 1111, one station acting as the RTT Source transmits a first data packet 1121. The first data packet 1121 includes RTT test data and ACK. In response to the second CF polling packet 1113, the other station acting as the RTT Destination transmits a second data packet 1123. The second data packet includes RTT response data and ACK. The total delay for the RTT test in this example, however, can be longer than that in the example given in FIG. 10. Time-out is used to detect whether the packet is lost or not.

c) RTT Test Based on HCF

IEFE 802.11e is an approved amendment to the IEEE 802.11 standard that defines a set of Quality of Service (QoS) enhancements for WLAN applications through modifications to the MAC layer. The 802.11e standard includes a new reservation function, the Hybrid Coordinated Function (HCF), that represents an enhancement over a polling-based reservation protocol such as the PCF. For the AP and stations which have the HCF and the QoS support, the AP can allocate Transmission Opportunity (TXOP) period to support data sequence transmissions between the AP and the station. The supported sequences are specified in IEEE 802.11e. However, for the RTT test, transmission opportunities for two devices need to be reserved through the AP in certain embodiments. In order to support RTT test between device A and device B, a bidirectional RTT TXOP can be defined and used. The RTT TXOP can include a RTT test data frame (from device A) and a subsequent RTT response data (from device B). Within the HCF framework, a flexible period of time can also be reserved to accommodate retransmissions, for example, 7 ms or less in certain embodiments.

Various advantages of performing RTT test during one of the 802.11 defined functions—DCF, PCF, and HCF—described above will be apparent to the one skilled in the art. For example, the defined functions, having been designed to reduce data collisions and interferences in a wireless network, provide appropriate platforms to launch the RTT test for proximity control in WLAN. In particular, the RTT test can be implemented in the DCF and the PCF with only minor modifications to the existing defined features. In contrast, existing RTT schemes cannot support accurate RTT in a wireless network without incurring long random access delays.

Although the systems and methods for RTT test supports for proximity control are described above with regards to specific IEEE 802.11/802.11e functions, it will be apparent to the one skilled in the art that the systems and methods can be applied to other wireless protocols, such as Bluetooth.

II. Proximity Control Scheme Based on Authorization Token

Figure 12:
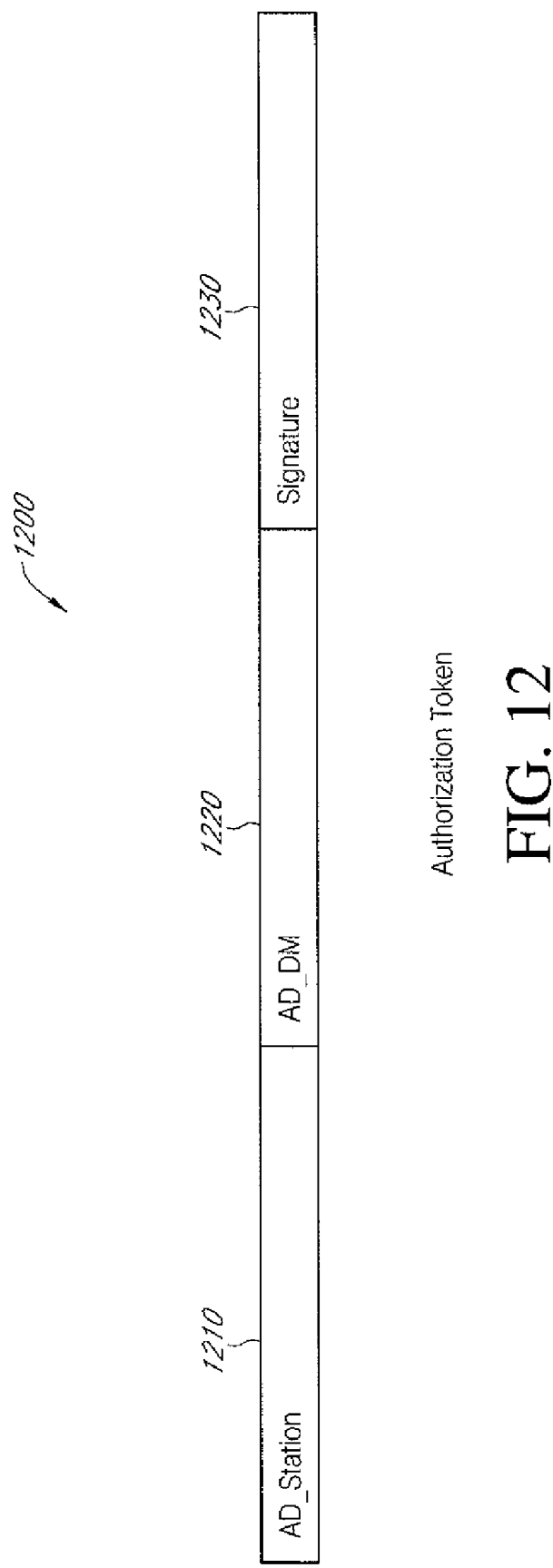
FIG. 12 is an example of an authorization token according to certain embodiments.

We now turn our attention to a proximity control scheme based on an authorization token for use in a network domain. In a network domain, one device acts as a domain manager. Under this proximity control scheme, an authorization token used for proximity control is issued to a device which is within the proximity of the domain manager. One example of an authorization token 1200 is shown in FIG. 12, where AD_Station 1210 is the MAC address of the station, AD_DM 1220 is the MAC address of the Domain Manager, and a Signature 1230 is formed by the domain manager signing the hash of (AD_Station, AD_DM, PublicKey_Station) with a private key of the domain manager. The authorization token can also include identifiers of the domain manager and the device. The authorization token can also include the hash of the device's public key. The hash can be the hash of the identifiers plus the public key of the device.

Figure 13:
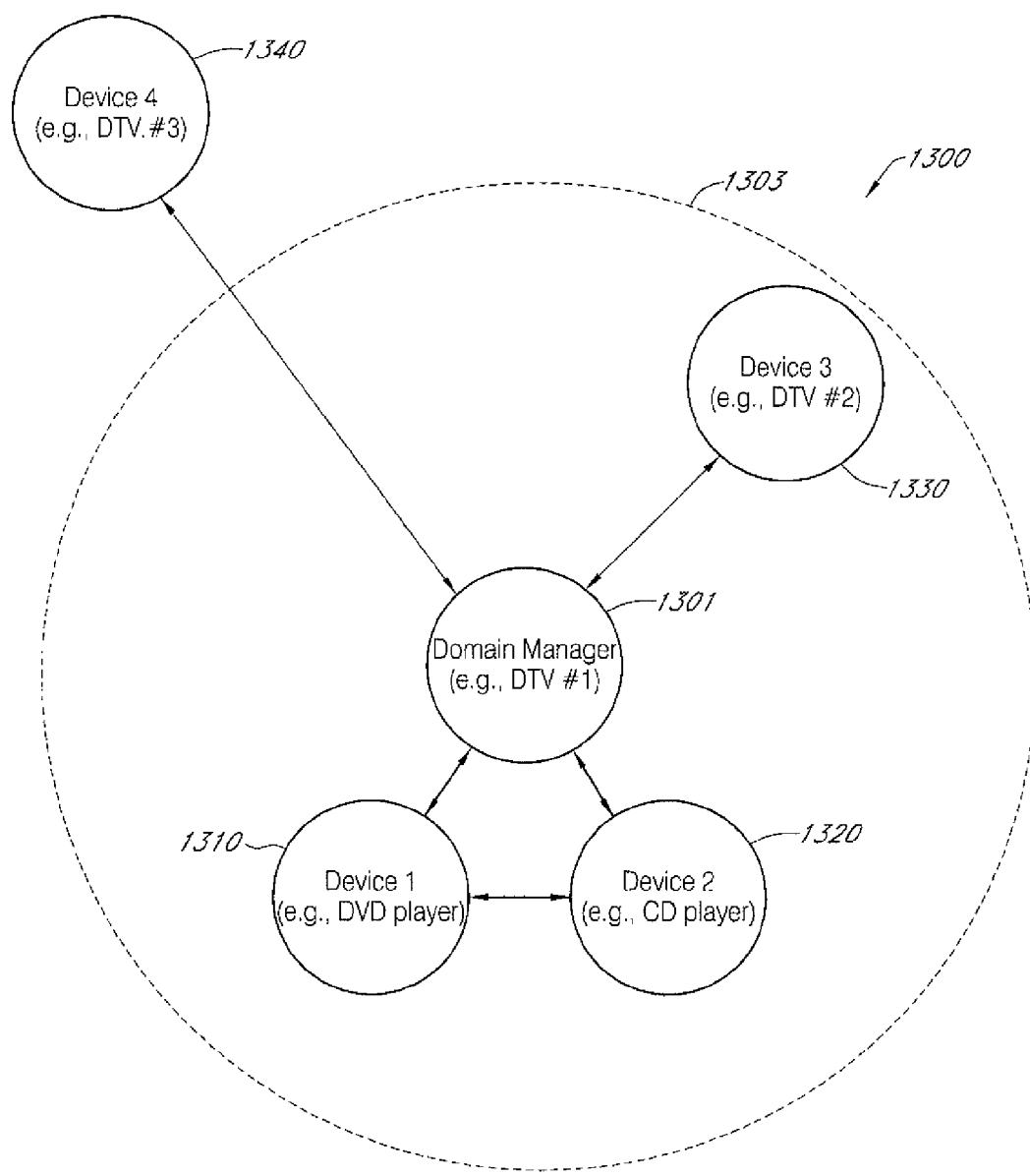
FIG. 13 is a schematic diagram illustrating an example of a wireless network domain in which tokens for proximity control are issued to devices which are within the proximity of a domain manager, according to certain embodiments.

FIG. 13 is a schematic diagram illustrating an example of a wireless network domain in which tokens for proximity control are issued to devices which are within the proximity of a domain manager 1301, according to certain embodiments. In the example, a domain 1300 includes a domain manager 1301, existing devices 1310, 1320, and new devices 1330, 1340 seeking to join the domain. In the example, Device 1 and Device 2 are the existing devices with issued authorization tokens. Device 3 and the Device 4, on the other hand, are new devices seeking to join the domain by requesting authorization tokens from the domain manager. The domain manager 1301 makes the decision to grant or reject the request for authorization tokens at least partly based on physical proximity of the new devices to the domain manager. If the requesting device, e.g., Device 3 1330, is located within an acceptable proximity range 1303, for example, the request is granted. On the other hand, if the requesting device, e.g., Device 4 1340, is located outside the acceptable proximity range 1303, the request is rejected. The measurement of the distance of the new devices to the domain manager can be done by different methods, such as the RTT test. Under the proximity control scheme based on authorization token, content can be controlled to be shared in the vicinity of the domain manager. Before the devices in the domain can share content, they need to exchange the authorization tokens and authenticate with each other. If the tokens for the devices share the same AD_DM 1220 (FIG. 12), for example, they are in the same vicinity of the domain manager. In this way, content can be controlled to be shared by devices in a certain range. In certain embodiments, the token has an expiration time, for example 30 hours. In other embodiments, other expiration times can be used. After the token expires, to establish a connection, a new proximity control test needs to be run again so that a new token can be issued.

Figure 14:
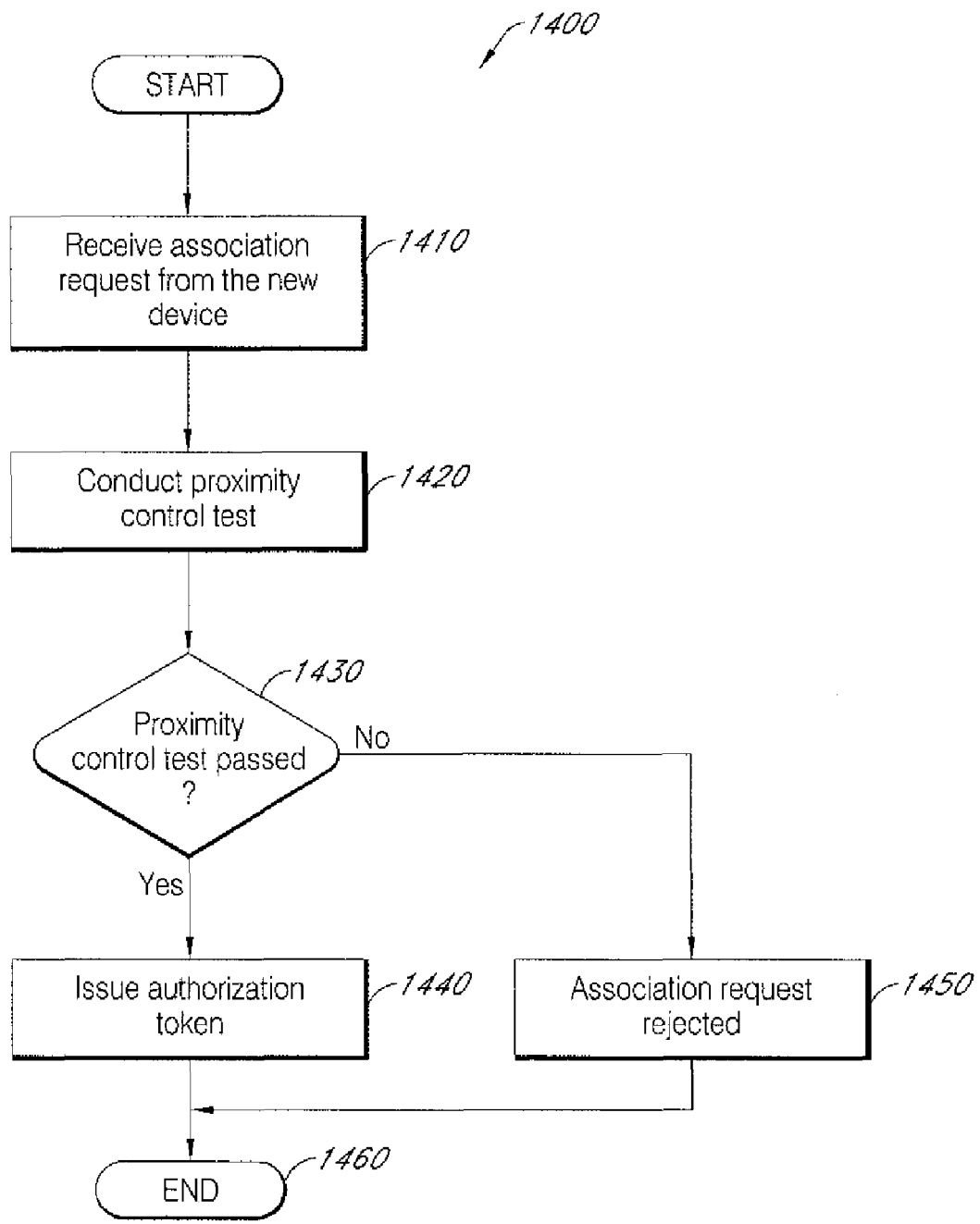
FIG. 14 is a flow diagram illustrating an example process for establishing association with the domain manager according to certain embodiments.

FIG. 14 is a flow diagram illustrating an example process 1400 for establishing association with the domain manager according to certain embodiments. In one embodiment, the underlying protocol can be IEEE 802.11 with proximity control test support as discussed above in Section I. The process 1400 begins at state 1410, where an association request from a new device is received by the domain manager. The process moves to state 1420, where a proximity control test is conducted to measure the distance between the domain manager and the new device making the association request. It will be apparent to one skilled in the art that the proximity control test can be based on many different methods including the RTT test-based method described in Section I above or non-RTT location estimation methods based on ranging and power control techniques based on transmit RF power level, for example. The process then moves to a decision state 1430, where it is determined whether the new device passes the proximity control test. If the answer is NO (the new device fails the test), the process branches to state 1450, where the association request is rejected, and the process ends at state 1460. If the answer is YES (the new device passes the test), the process branches to state 1440, where an authorization token is issued to the new device by the domain manager. This authorization token is then transmitted to the new requesting device. The device receives and stores the authorization token together with the domain manager's public key. The domain manager's public key can be transmitted to the device together with the authorization token, or the device can obtain it through other methods. This public key is used to verify other authorization tokens issued by the domain manager for other devices in the same domain.

Figure 15:
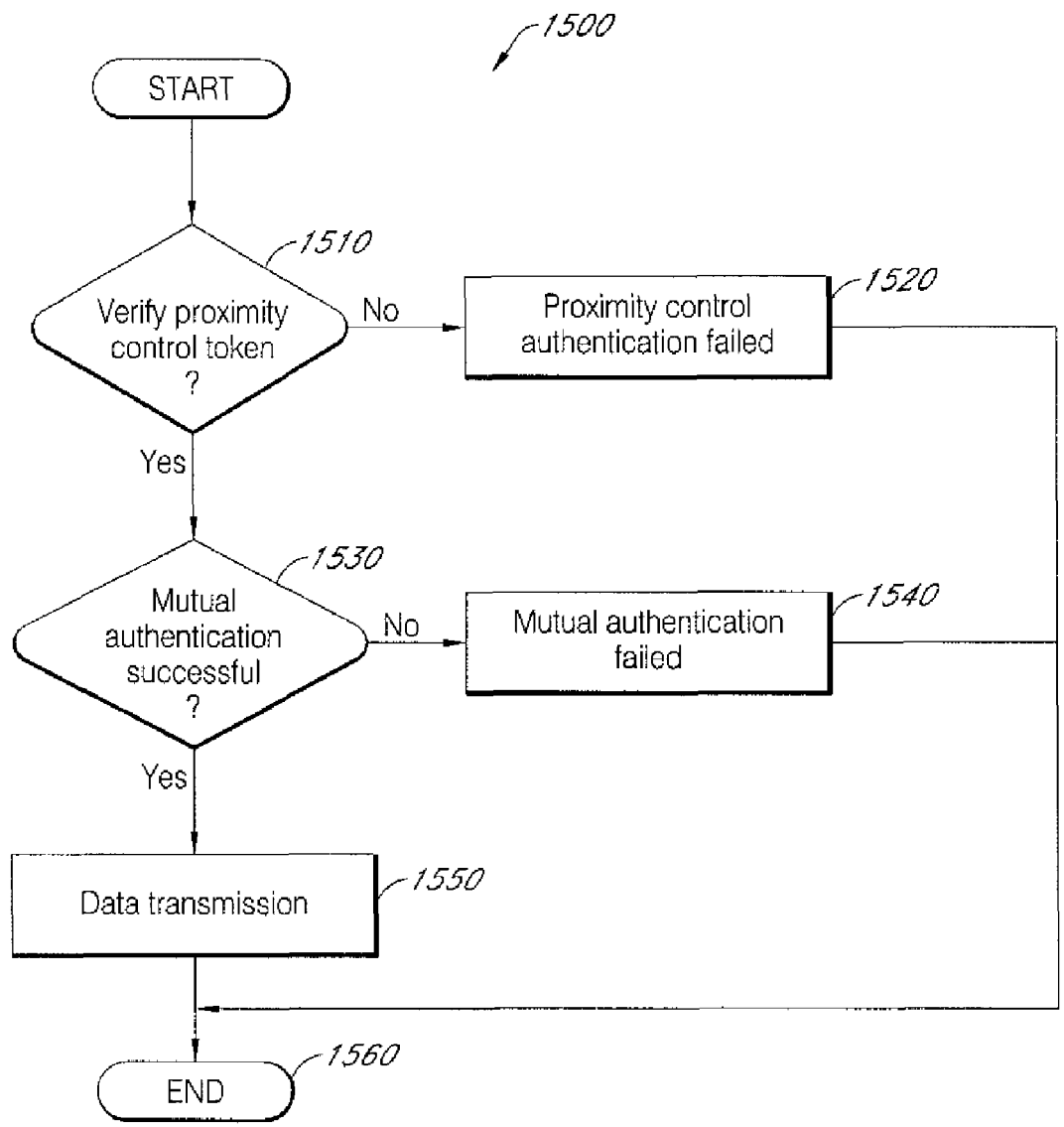
FIG. 15 is a flow diagram illustrating an example process for verifying the proximity control token between two devices according to certain embodiments.

When two devices with issued tokens authenticate with each other using a protocol, such as IEEE 802.11x, an extra authentication step of verifying the proximity control token is taken. FIG. 15 is a flow diagram illustrating an example process 1500 for verifying the proximity control token between two devices according to certain embodiments. The process 1500 begins at a decision state 1510, where a first device verifies a proximity control token sent from a second device. If the token cannot be verified due to an invalid Signature, for example, the process branches to state 1520, where the proximity control authentication fails; and the process then ends at state 1560. On the other hand, if the token is verified, the process moves to a decision state 1530, where the first device and the second device conduct a mutual authentication procedure for security reasons. In certain embodiments, the mutual authentication procedure includes exchange and verification of public keys relating to certificates. In other embodiments, the mutual authentication procedure for security reasons is performed within the procedure for verifying the proximity token. If the mutual authentication procedure fails, the process branches to state 1540, where the mutual authentication failure is confirmed; and the process ends at state 1560. On the other hand, if the mutual authentication procedure passes, the process branches to state 1550, where one of the devices transmits content, e.g., A/V data, to the other device.

Conclusion

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method of providing content protection in a wireless network, the method comprising:
   receiving an association request from a new device by a domain manager;
   conducting a proximity control test to determine whether the new device is located within an acceptable computed distance from the domain manager, wherein the proximity control test includes a round trip time (RTT) test, and the proximity control test is launched within a modified reservation function defined within a wireless protocol;
   determining whether to grant or reject the association request based at least partly on the result of the proximity control test;
   transmitting an authorization token and the domain manager's public key to the new device when the association request is granted, wherein the public key is used to verify other authorization tokens of other devices within the wireless network that are within the acceptable computed distance from the domain manager.

2. An apparatus for providing content protection in a wireless network, the apparatus comprising:
   a receiver configured to receive an association request from a new device; and
   a processor configured to:
      conduct a proximity control test to determine whether the new device is located within an acceptable computed distance from the apparatus, and
      determine whether to grant or reject the association request based at least partly on the result of the proximity control test, wherein a public key is used to verify an authorization token of the new device within the wireless network that is within the acceptable computed distance from the apparatus, wherein the authorization token includes: a signature field formed by a domain manager, an identifier of one of the domain manager and the new device, and a hash of the public key of the new device.

3. The apparatus of claim 2, wherein the apparatus is a domain manager.

4. The apparatus of claim 2, wherein the processor is further configured to send the authorization token to the new device when the association request is granted.

5. The apparatus of claim 2, wherein the authorization token further includes a hash of the identifier concatenated with the public key of the new device.

6. The apparatus of claim 2, wherein the proximity control test includes a round trip time (RTT) test.

7. A method of providing content protection in a wireless network, the method comprising:
    receiving an authorization token transmitted from a second device by a first device located within a domain having an acceptable computed proximity distance range to a domain manager, wherein the authorization token includes: a signature field formed by a domain manager, an identifier of one of the domain manager and the new device, and a hash of the public key of the new device;
    verifying that the authorization token is issued to the second device for being located within the domain, wherein a first public key belonging to the first device is used to verify the authorization token received by the second device and authorization tokens of other devices within the wireless network that are within the acceptable computed distance from the domain manager; and
    transmitting protected content to the second device from the first device.

8. The method of claim 7, wherein the verifying includes authenticating a signature field of the authorization token.

9. The method of claim 7, further comprising conducting a mutual authentication procedure by the first device and the second device.

10. The method of claim 9, wherein the mutual authentication procedure includes transmitting the first public key belonging to the first device signed by the domain manager to the second device for authentication and receiving a second public key belonging to the second device signed by the domain manager for authentication.

11. An apparatus for providing content protection in a wireless network, the apparatus comprising:
    a processor configured to:
        receive an authorization token by a first device transmitted from a second device located within a domain having an acceptable computed proximity distance range to a domain manager, wherein the authorization token includes: a signature field formed by a domain manager, an identifier of one of the domain manager and the new device, and a hash of the public key of the new device, and
        verify that the authorization token is issued to the second device for being located within the domain, wherein a public key belonging to the first device is used to verify the authorization token received by the second device and authorization tokens of other devices within the wireless network that are within the acceptable computed distance from the domain manager; and
    a transmitter configured to transmit protected content to the second device.

12. The apparatus of claim 11, wherein the processor is configured to verify the authorization token by authenticating the signature field of the authorization token.

13. The apparatus of claim 11, wherein the processor is further configured to conduct a mutual authentication procedure.

14. A non-transitory computer-usable medium in a system for providing content protection in a wireless network having computer readable code comprising instructions for:
    receiving an association request from a first device by a domain manager in a wireless domain, wherein the first device having an acceptable computed proximity distance range to the domain manager;
    conducting a proximity control test to determine whether the first device is located within the acceptable computed proximity distance range to the domain manager, wherein the proximity control test includes a round trip time (RTT) test, and the proximity control test is launched within a modified reservation function defined within a wireless protocol;
    determining whether to grant or reject the association request based at least partly on the result of the proximity control test;
    receiving an authorization token transmitted from the first device by a second device located within the wireless domain having an acceptable computed proximity distance range to the domain manager;
    verifying that the authorization token is issued to the first device for being located within the domain; and
    transmitting protected content to the first device.

15. The method of claim 1, wherein the reservation function is defined by a wireless protocol prior to modification.

16. The method of claim 15, wherein the modified reservation function is one of a distributed coordinated function (DCF), a point coordinated function (PCF) and a hybrid coordinated function (HCF).

17. The method of claim 16, wherein the reservation function is modified from a wireless protocol defined reservation function to include RTT test indicators.

18. The method of claim 1, wherein the RTT test computes a measurement of distance from the new device to the domain manager.

19. The method of claim 1, wherein the RTT test is performed during an IEEE 802.11 defined function comprising: a distributed coordinated function (DCF), a point coordinated function (PCF) and a hybrid coordinated function (HCF).

20. An apparatus for providing content protection in a wireless network, the apparatus comprising:
    a receiver configured to receive an association request from a new device; and
    a processor configured to:
        conduct a proximity control test to determine whether the new device is located within an acceptable computed distance from the apparatus, and
        determine whether to grant or reject the association request based at least partly on the result of the proximity control test, wherein a public key is used to verify an authorization token of the new device within the wireless network that is within the acceptable computed distance from the apparatus, wherein the authorization token includes: a signature field formed by a domain manager, an identifier of one of the domain manager and the new device, and a hash of the identifier concatenated with the public key of the new device.

* * * * *